June 2, 1936.  E. J. KRINARD  2,043,045
COOKING UTENSIL
Filed May 14, 1935
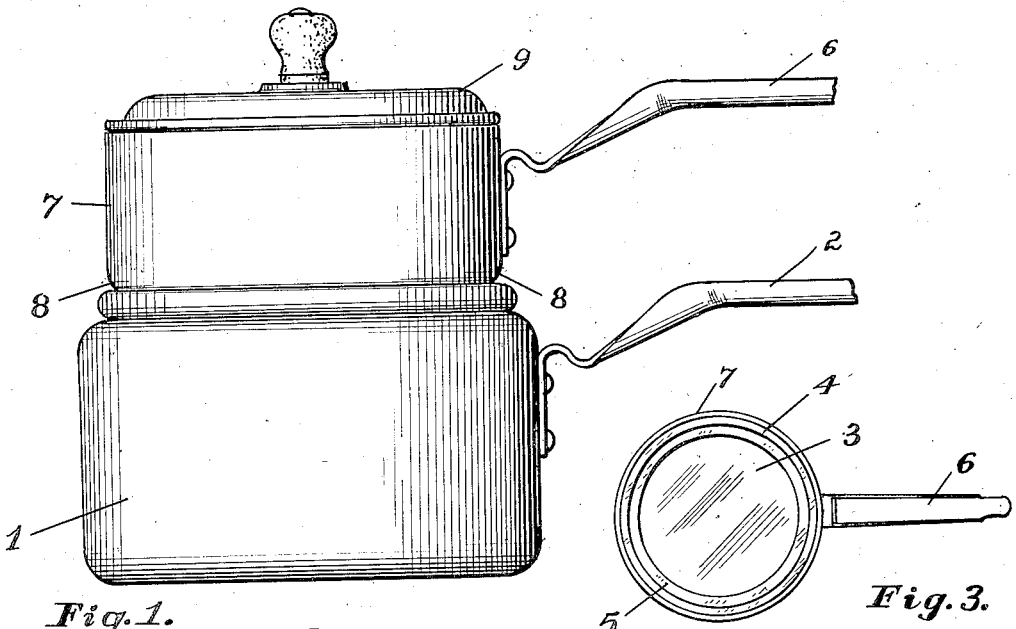
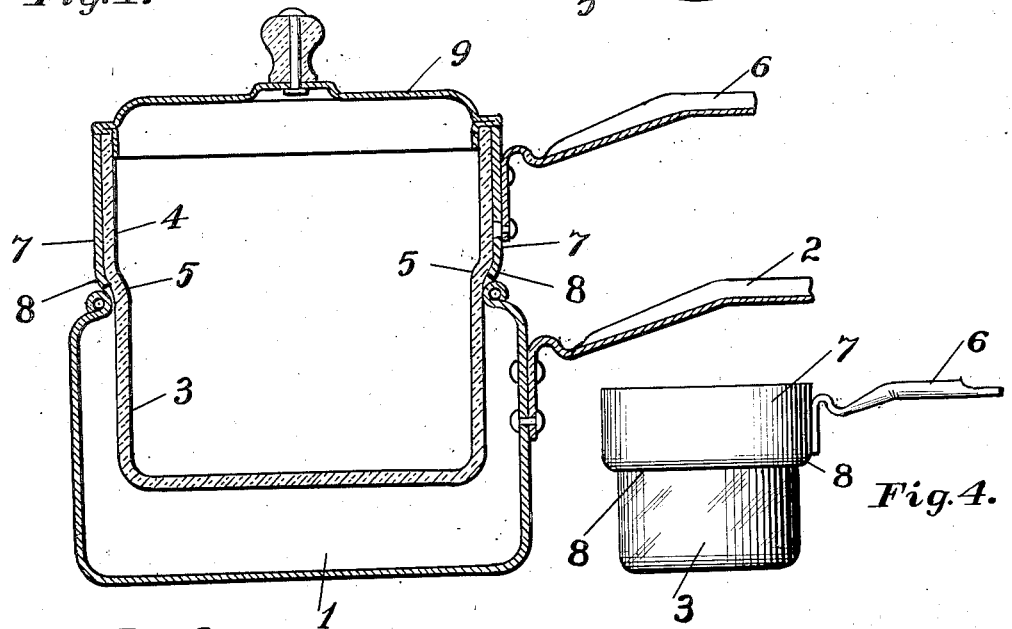
Inventor
Emma J. Krinard,
By H. M. Plaisted,
Attorney Patented June 2, 1936

2,043,045

UNITED STATES PATENT OFFICE 2,043,045

COOKING UTENSIL

Emma J. Krinard, St. Louis, Mo.

Application May 14, 1935, Serial No. 21,365

2 Claims. (Cl. 53—1)

This invention relates to certain new and useful improvements in cooking utensils, the peculiarities of which will be hereinafter fully described and claimed.

This invention relates to that class of cooking utensils known as double boilers, having an inner and an outer pot, the latter for water and subject to the direct heat of the stove, and the inner pot exposed to the heat of boiling water, 212 degrees F. for cooking the contents.

In cooking icing for frosting cakes, sugar and white of egg with the proper amount of water, are put in the inner pot and constantly stirred for seven minutes, thereby making a fluffy icing that is superior to that made by whipping the materials while cold.

When an aluminum pot is used, a grayish tint is given to the icing; an enamel ware pot is liable to be chipped by the egg beater used in whipping the contents.

It is one of the main features of my invention to use an inner pot of glass, made of elements which will withstand the heat of boiling water, is not subject to chipping, and will not stain the icing or other material cooked therein,—such glass as that used for fruit preserving jars or that of which baking pans are made, or other suitable glass. The inner pot of my construction hereinafter described, made of glass more or less transparent, will have the characteristic of not tinting the icing being cooked which will thus preserve its original whiteness; it will be non-chipping, and thus avoid any danger of particles being knocked off by the egg beater; and will allow observation of uniformity of the icing through the side walls of the inner pot. Other features of construction will appear in the following description.

In the accompanying drawing in which like reference numerals indicate corresponding parts.

Fig. 1 represents a side elevation of a cooking utensil of the class described exemplifying my invention;

Fig. 2, a central vertical section of the same;

Fig. 3, a plan view of the inner pot by itself on a smaller scale, and

Fig. 4, a side view of the same.

Referring to the drawing, the numeral 1 designates a pot of aluminum or other suitable metal, containing water and having a handle 2. This constitutes the outer pot of the double boiler and is subject directly to the heat of a gas, or other stove.

Supported in said outer pot is a glass inner pot of smaller diameter so it may be set in the outer pot and its lower portion surrounded by water in the usual manner. This glass inner pot in my construction, is characterized by not staining the icing or similar material being cooked therein. Its lower portion 3, in the usual form of the inner pot, is of lesser diameter than its upper portion 4, thus providing a projecting shoulder 5 for support on the rim of the outer pot. This projecting shoulder is usually nearer the rim of the inner pot than the bottom. It may be otherwise formed if desired.

The rim of the outer pot is formed of a smaller diameter than the main portion of the outer pot to provide the usual space for boiling water surrounding the inner pot set therein.

The outer pot has its usual handle 6, but the inner pot is provided with a handle combined with a band 7 encircling the upper portion of the inner pot above said shoulder, and has on its lower edge, an inward flange 8, extending under said shoulder so that the inner pot may be lifted out of the outer pot. When resting in the outer pot as in use, this flange 8 engages the rim of the outer pot and is thus interposed between said shoulder and the rim of the outer pot. This band is preferably not fastened to the glass inner pot, but is detachably slipped over the lower portion and upward till said flange engages said shoulder. Thus in case of any accident to the glass inner pot that fractures it, a new pot in replacement can then be readily provided. During the seven minutes usually required in cooking icing, it is constantly subject to the action of an egg beater, which often strikes the sides of the pot. These blows from the rapidly whirring beaters would be liable to break particles from an enamelware pot. Such danger is avoided in my construction, and the glass is of such constituents that the boiling water will not fracture it.

The usual cover 9 for the double boiler is provided.

Thus the characteristics of my glass inner pot as stated above, viz. withstanding the heat of boiling water, allowing the icing being cooked therein to retain its whiteness, the avoidance of any particles being chipped off by the egg beater during its operation on the icing, and the transparency of the lower portion of the inner pot below the encircling band of the handle, all contribute to the excellence of an inner pot of my construction and material.

I claim:

1. A cooking utensil for making icing for frosting comprising a main receptacle, a receptacle of frangible material having an annular peripheral shoulder intermediate its top and bottom, a relatively wide metal band surrounding the frangible receptacle above the peripheral shoulder, and a handle attached to said band, said band having an inturned flanged lower edge portion underlying the peripheral shoulder and supporting the frangible receptacle and resting upon the upper edge of the main receptacle.

2. A cooking utensil for making icing for frosting comprising a main receptacle, a glass receptacle having an annular peripheral shoulder intermediate its top and bottom, a relatively wide metal band surrounding the glass receptacle above the peripheral shoulder, and a handle attached to said band, said band having an inturned flanged lower edge portion underlying the peripheral shoulder and supporting the glass receptacle and resting upon the upper edge of the main receptacle, said band being slidable upon the glass receptacle and being removably attached thereto permitting ready replacement of said glass receptacle upon breakage thereof.

EMMA J. KRINARD.